Figure 6:
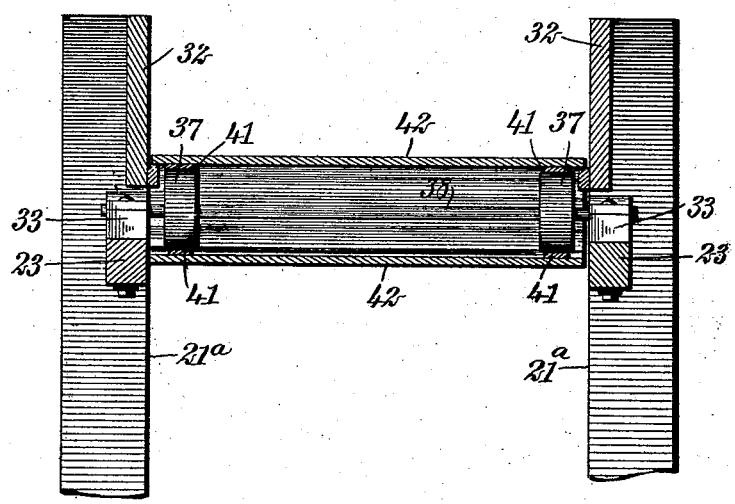

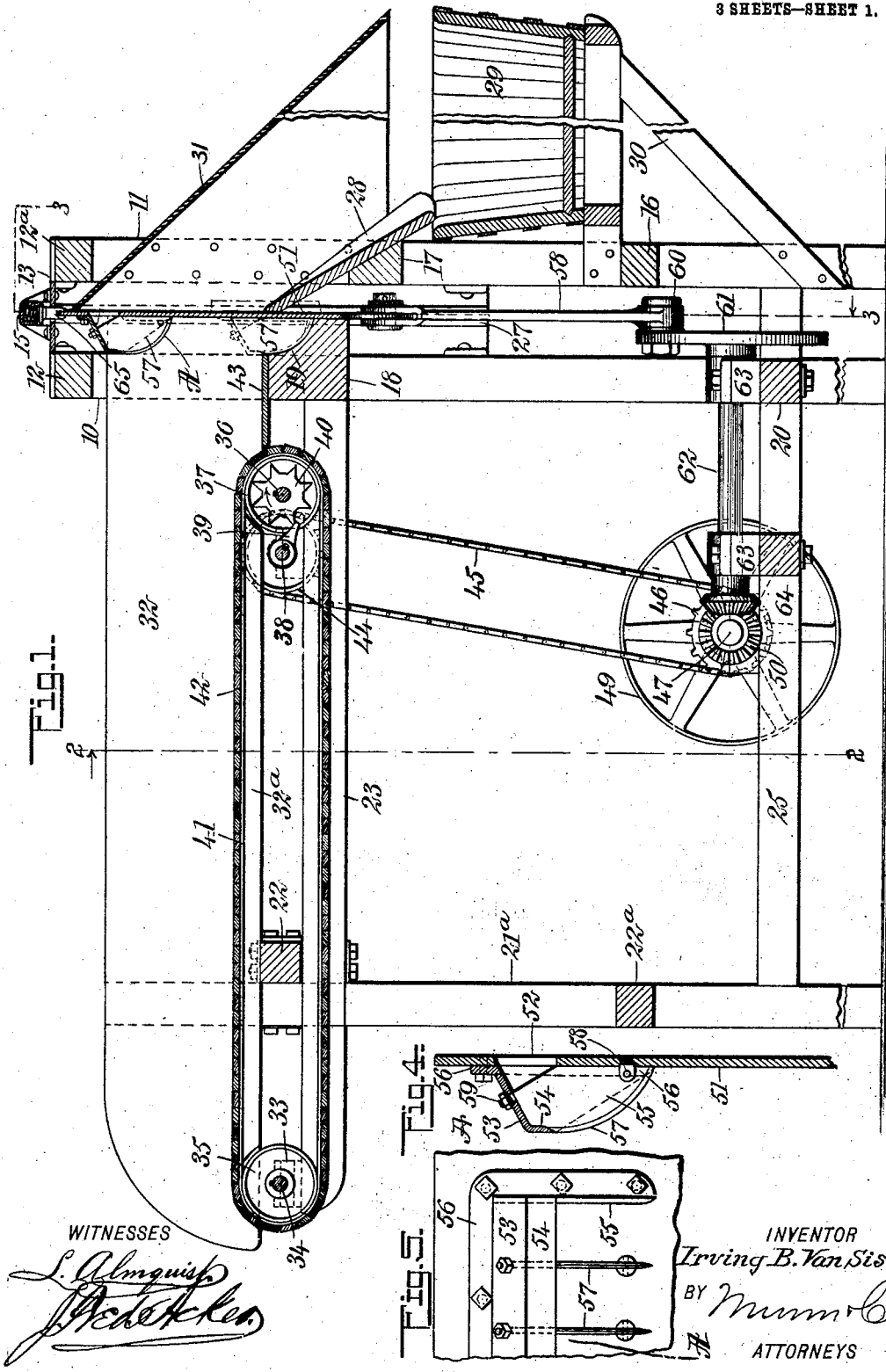

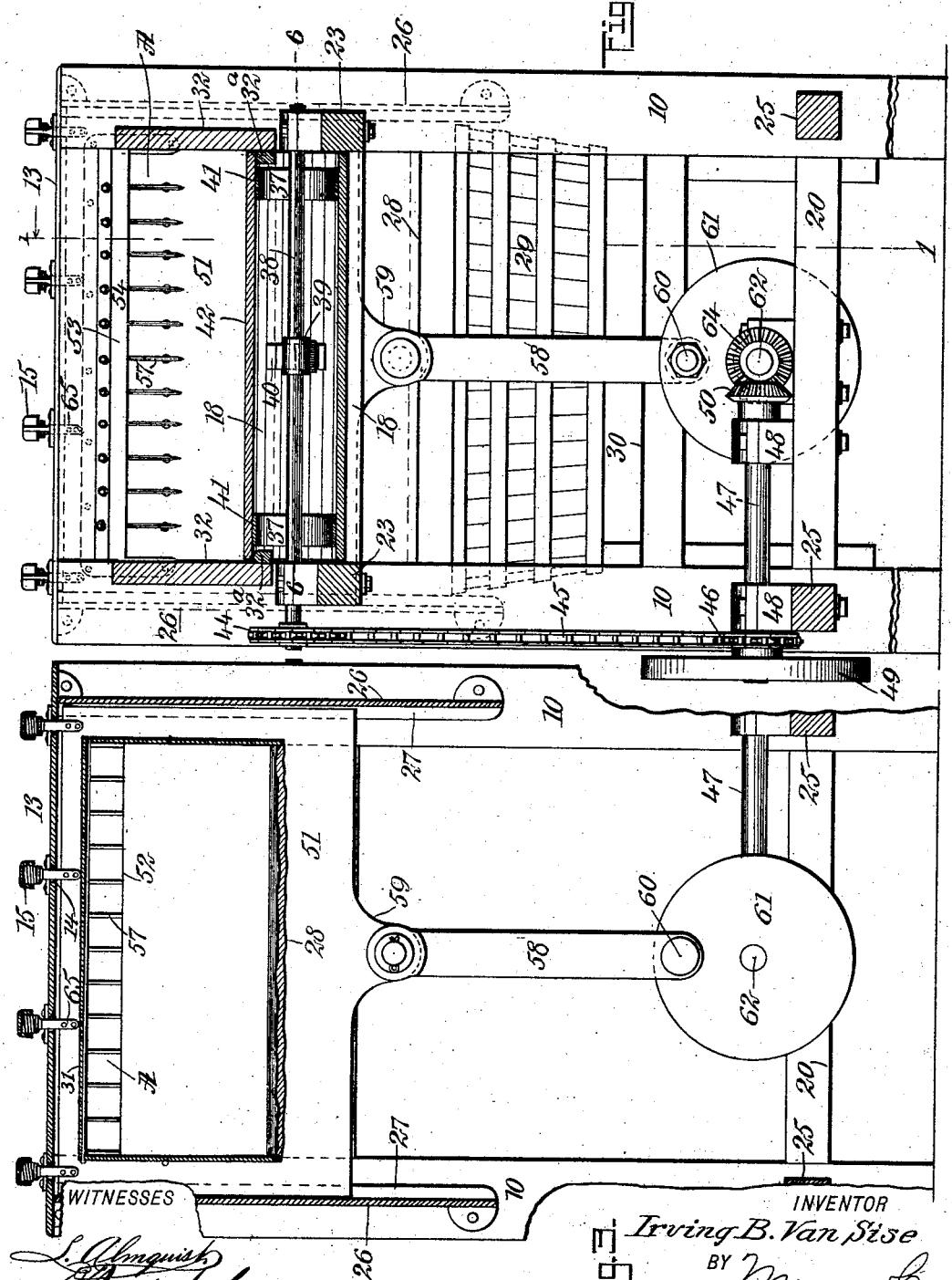

No. 849,945. PATENTED APR. 9, 1907.
I. B. VAN SISE.
MACHINE FOR CUTTING MEAT.
APPLICATION FILED JULY 27, 1906.

3 SHEETS—SHEET 3.

WITNESSES

INVENTOR
Irving B. Van Sise
BY
ATTORNEYS

UNITED STATES PATENT OFFICE.

IRVING BAYLES VAN SISE, OF OYSTER BAY, NEW YORK.

MACHINE FOR CUTTING MEAT.

No. 849,945.  Specification of Letters Patent.  Patented April 9, 1907.

Application filed July 27, 1906. Serial No. 328,064.

*To all whom it may concern:*

Be it known that I, IRVING BAYLES VAN SISE, a citizen of the United States, and a resident of Oyster Bay, in the county of Nassau and State of New York, have invented a new and Improved Machine for Cutting Meat, of which the following is a full, clear, and exact description.

The purpose of the invention is to provide a machine for cutting meat, especially sausage-meat, and to so construct the machine that it will be simple, durable, and economic and so that the feed will be intermittent, supplying the cutter at each movement of the feed with just sufficient material for the knives to properly handle.

Another purpose of the invention is to so construct the cutter that the cut meat will be automatically delivered therefrom into a receptacle placed to receive it and wherein there is no liability to clog, since in the cutting action of the knives any material that may have clung thereto will be discharged into said receptacle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the machine, the section being taken practically on the line 1 1 of Fig. 2. Fig. 2 is a central transverse vertical section taken practically on the line 2 2 of Fig. 1. Fig. 3 is a transverse vertical section taken substantially on the line 3 3 of Fig. 1. Fig. 4 is a detail vertical section through a portion of the cutter. Fig. 5 is an inner face view of a portion of the cutter, and Fig. 6 is an enlarged sectional view taken on the line 6 6 of Fig. 1.

In the construction of the frame parallel spaced side beams 10 and 11 are located at the rear, the side beam 10 being connected with the tops of transverse beams 12, and the vertical beams 11 are similarly connected by beams 12$^a$. A plate 13 is secured upon the upper faces of the said transverse beams 12 and 12$^a$, which plate has a series of openings 14 centrally made therein, and above each of said openings a buffer-nut 15 is located.

The rear upright beams or standards 11 are connected also by a rear bar 16 and an intermediate bar 17, while the standards or upright beams 10 are further connected by an intermediate wide beam 18, in the upper rear surface whereof a concaved or segmental pocket 19 is formed, extending from the top of said beam downward a desired distance, as is shown in Fig. 1, and the same beams or uprights 10 are connected at the bottom by a cross-bar 20.

Front parallel standards or beams 21$^a$ are provided, connected at their upper portions by a transverse beam 22, secured to the inner side faces of the upright beams 21$^a$, and the upper surface of the beam 22 is in horizontal alinement with the upper surface of the pocket-beam 18, as is also shown in Fig. 1. The said front beams 21$^a$ are further connected by a transverse bar 22$^a$. Longitudinal horizontal side beams 23 extend from the rear upright beams 10 to and beyond the forward upright beams 21$^a$ and are usually bolted to the transverse beam 22, and lower horizontal longitudinal beams 25 connect the forward and the rear upright beams.

In the side spaces between the beams 10 and 11 vertical plates 26 are bolted or otherwise secured, filling said spaces from a point at the top of the beams to a point at or near their centers, as is particularly shown in Fig. 1, and each of these plates 26 is provided with a vertical centrally-located slideway 27 upon its inner face, extending from top to bottom.

A trough 28 is supported by the rear transverse bar 17, which trough has a downward and a rearward inclination, the upper end of the trough being adjacent to the slideways 27 and practically in horizontal alinement with the upper surface of the pocket-beam 18. The trough 28 leads into a tub 29 or other receptacle, which is supported upon a platform 30 at the rear of the frame, as shown in Fig. 1, and said trough 28 is protected by a cover or shield 31, secured to the rear beams 11, and this shield 31 likewise covers the receptacle 29, and a space is provided between the upper ends of the trough 28 and its cover or protective shield 31 for a purpose to be hereinafter mentioned.

Side pieces 32 are located at the top of the frame, and said side pieces 32 rest upon the upper face of the pocket-beam 18 and the forward transverse beam 22, as also best shown in Fig. 1, and horizontal guide-rails 32ª are secured to the inner faces of the side pieces 32 at their lower edges, terminating short of the ends of the said side pieces, as is shown in Figs. 1 and 2.

Journal-boxes 33 are located on the upper longitudinal beams 23 at their forward ends, and in these boxes a shaft 34 is mounted to turn, provided near each end with a pulley 35, which pulleys are adjacent to the forward ends of the guide-rails 32ª, and opposite the inner or rear ends of said rails a second and parallel shaft 36 is mounted to turn in suitable bearings also carried by the forwardly-extending beams 23, and said shaft 36 has secured thereto pulleys 37, which correspond to the pulleys 35 on the shaft 34. At the central portion of the shaft 36 a star-wheel 40 is secured, turning with the said shaft. The teeth of the said star-wheel are engaged by a finger 39, which extends from the central portion of an intermediate shaft 38, as is shown in Figs. 1 and 2. The shaft 38 through the medium of the finger 39 turns the shaft 36 intermittently.

Endless belts 41 are passed over corresponding pulleys 35 and 37, and transverse slats 42 are secured to the outer faces of said belts, forming thereby a conveyer for the meat to be cut, which meat is delivered by the conveyer upon a table 43, supported on the upper face of the pocket-beam 18, which table extends from the rear end of the conveyer to the wall of the pocket 19 at its mouth, as is also shown in Fig. 1.

The shaft 38 is driven by means of a sprocket-wheel 44, (shown best in Fig. 2,) secured to the shaft at one end, which sprocket-wheel is connected by a chain belt 45 with a sprocket 46 on the drive-shaft 47, journaled in bearings 48 at the base of the frame transversely of said frame, and the shaft 47 is provided at its outer end with a driving-pulley 49, and at its inner end a beveled pinion 50 is secured.

A cutter A is adapted to slide in the ways 27, formed on the connecting side plates 26, as is shown in Figs. 1, 2, and 3. In the construction of this cutter a body-plate 51 is employed, the side edges of which enter the slideways 27, as is fully shown in Fig. 3, and when the cutter is in its upper position the body-plate 51 extends from the top plate 13 of the frame to a point practically below the lower edge of the pocket-beam 18.

The body-plate 51 of the cutter adjacent to its upper edge is provided with a horizontal opening 52, which opening is adapted to register with the opening between the upper edges of the chute or trough 28 and its protective shield 31, and when the body-plate 21 is in its lowest position the opening 52 registers with the upper end of the chute 28, enabling the cut meat to pass from the cutter through said opening 52 to the chute or trough 28 and be delivered to the receptacle 29.

A downwardly and forwardly inclined housing 53 is secured to the front face of the body-plate 51 of the cutter just at the upper edge of the opening 52 in said plate, as is particularly shown in Fig. 4, and at the forward longitudinal edge of the said housing a downwardly-extending blade 54 is provided, having its rear or inner face beveled at its edge to form a sharp cutting edge, and side pieces 55 extend down from the housing to the body-plate 51, while a marginal flange is provided for said housing and its side or cheek pieces, said flanges being secured to the body-plate 51 by bolts or their equivalents.

Vertical knives 57 are also secured to the front face of the body-plate 51, being usually at regular intervals apart. These vertical knives 57 extend from the upper face of the housing 53 to an engagement with the front face of the body-plate 51, and their outer or cutting edges are convexed and extend down at their upper portions in alinement with the horizontal knife 54, as is shown in Fig. 4. The vertical knives 57 may be secured in position in any suitable or approved manner. Preferably, however, slotted heads 58 are screwed into the body-plate, which receive the inner edges of the vertical knives at their bottom portions, and pins are passed through said heads and through the knives, and at the upper rear portion of each vertical knife 57 a threaded lug is preferably provided, which lugs extend out through apertures in the housing 53 and receive suitable nuts; but the knives may be otherwise secured if found desirable. Furthermore, the upper inner edges of the knives are cut away so as not to interfere with the continuity of the discharge-opening 52 in said body-plate 51.

It will be observed that a cutter having the above-described arrangement of knives produces a longitudinal and transverse cut or crosscut at the same time, thus rendering the material submitted to the knives quite evenly divided. The vertical knives when the cutter A is in its lowest or cutting position fit quite snugly in the pocket 19, as is shown by dotted lines in Fig. 1.

Each movement of the conveyer brought about by the finger 39 and star-wheel 40 is just sufficient to move a quantity of meat on the table 43 into the pocket 19, and this movement takes place while the cutter is on its upward travel, and when the cutter is drawn downward, bringing the knives into action on the meat in the pocket 19, any of the material that may have clung to the knives in their upward movement will be forced out through the outlet-opening 52 to the chute 28 by the fresh supply of meat presented to the knives. In this way the knives are actually self-cleaning and there is no danger of the machine becoming clogged.

The cutter is vertically reciprocated by means of a pitman 58', which is pivotally attached, preferably to a lip 59, which extends from the central portion of its lower edge, and said pitman 58' is connected by a wrist-pin 60 with a disk 61, mounted upon a longitudinal shaft 62, located at the rear central portion of the frame, turning in suitable bearings 63. This shaft 62 has a bevel-pinion 64 at its forward end, which meshes with the beveled pinion 50 on the drive-shaft 47.

In order that the cutter shall not be jarred when arriving at the top plate 13, headed projections 65 are formed at or are attached to the upper edge of the body-plate 51, and said projections are adapted to enter the buffer-nuts heretofore referred to and illustrated in Figs. 1, 2, and 3.

I desire it to be understood that while I have described the machine as particularly adapted for chopping sausage-meat it can be employed for cutting meat for other purposes or for chopping other material adapted to it.

Having thus described my invention, I claim as new and desire to secure by Letters Patent—

1. In a cutting-machine, a conveyer, means for imparting intermittent motion to the conveyer, a support at one end of the conveyer, having a pocket adapted to receive material from the conveyer, said pocket being open at its rear and having an inner concave wall, a cutter mounted to reciprocate relative to the support, and the open portion of the pocket, which cutter comprises a body-plate that constitutes the outer wall of said pocket and is provided with an opening for material in the pocket, a series of vertical knives crossing said opening, and a horizontal knife crossing the vertical knives, the edges of the knives being in correlation.

2. In a cutting-machine, a frame, a conveyer mounted in said frame, means for driving the conveyer, the said frame being provided with a pocket adjacent to one end of the conveyer, being adapted to receive material therefrom, the said pocket being open at its rear and having its inner wall concaved, a cutter mounted to reciprocate at the open side of the pocket, which cutter consists of a body-plate constituting a closure for the open side of the pocket, the said body-plate being provided with an opening therein for the outlet of material in said pocket, a housing extending from the upper wall of the said opening in direction of the pocket, a horizontal knife extending downward from the outer edge of the said housing, and vertical knives located beneath the said housing and having convexed outer edges, the vertical and horizontal knives being adapted to the contour of the said pocket, and means for reciprocating the said cutter.

3. In a cutting-machine, a frame, a conveyer mounted in said frame, means for driving the conveyer, the said frame being provided with a pocket adjacent to one end of the conveyer, being adapted to receive material therefrom, the said pocket being open at its rear and having its inner wall concaved, a cutter mounted to reciprocate at the open side of the pocket, which cutter consists of a body-plate constituting a closure for the open side of the pocket, the said body-plate being provided with an opening therein for the outlet of material in said pocket, a housing extending from the upper wall of the said opening in direction of the pocket, a horizontal knife extending downward from the outer edge of the said housing and vertical knives located beneath the said housing and having convexed outer edges, the vertical knives and the horizontal knife being adapted to the contour of said pocket, a chute leading from the frame downward and rearward from a point opposite the said pocket at the rear of the body-plate of the cutter, a shield for the said chute, spaced therefrom at the upper edge of said chute, and a support for a receptacle located beneath the said chute.

4. In a cutting-machine, the combination with a frame having a pocket formed therein adapted to receive material to be chopped, which pocket is open at one side and at the top, shafts journaled in the said frame adjacent to said pocket, pulleys secured to the said shafts, a conveyer-belt passed over the said pulleys, a star-wheel secured to one of the pulley-shafts, a driven shaft located between the pulley-shafts, a finger extending from the driven shaft for engagement with said star-wheel, a drive-shaft, and a connection between the drive-shaft and the driven shaft, of a cutter mounted to reciprocate past the open side of the said pocket, the said cutter comprising a body-plate which forms a closure for the open side of the pocket, the said plate being provided with an opening for the outlet of material in the pocket, a housing above the said opening, and longitudinal and vertical knives which extend from the said housing, the vertical knives crossing the said opening, and said knives being adapted to the contour of the said pocket, and a driving connection between the said cutter and the said drive-shaft.

5. In a cutting-machine, a cutter comprising a body-plate having a longitudinal opening therein for the outward passage of material that has been chopped, housing extending from the body-plate at the upper edge of the opening, vertical knives extending down from the housing and crossing the said opening, said knives being convex, and a knife forming a portion of the lower edge of the housing, which knife crosses the vertical knives, the cutting edges of the vertical knives and the cutting edge of the crossing knife being in engagement.

In testimony whereof I have signed my name to this specification in the presence of two subscribing witnesses.

IRVING BAYLES VAN SISE.

Witnesses:
CLINTON D. TALMAGE,
JAMES L. LONG.